Aug. 17, 1937.    G. CARWARDINE    2,090,439
EQUIPOISING MECHANISM
Filed June 29, 1933    4 Sheets-Sheet 1
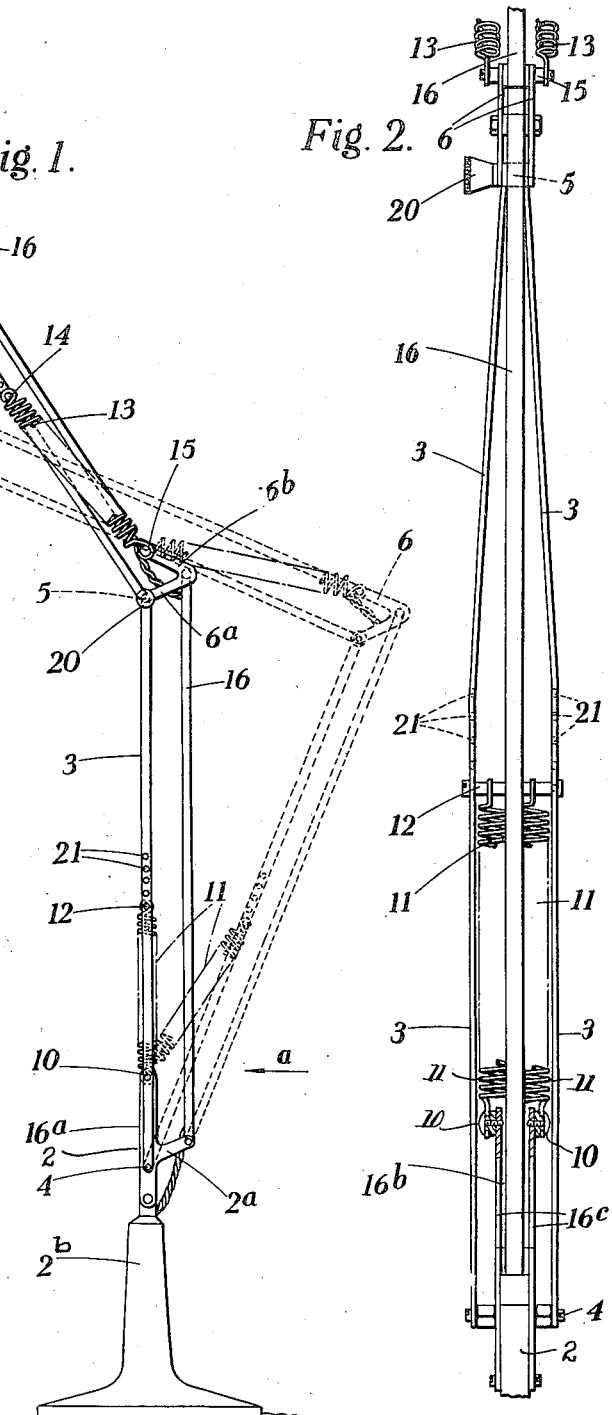

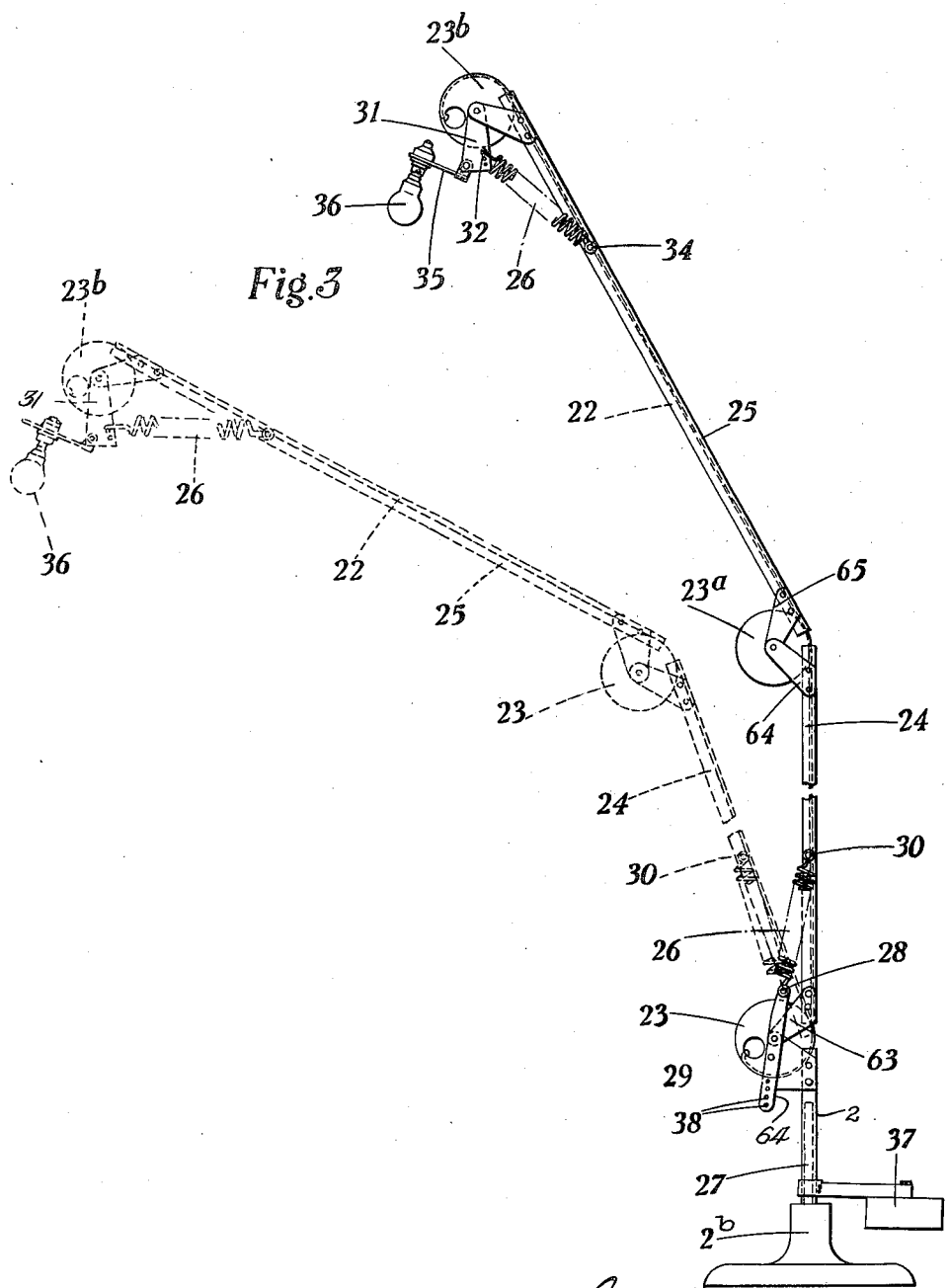

Aug. 17, 1937. G. CARWARDINE 2,090,439
EQUIPOISING MECHANISM
Filed June 29, 1933 4 Sheets-Sheet 3
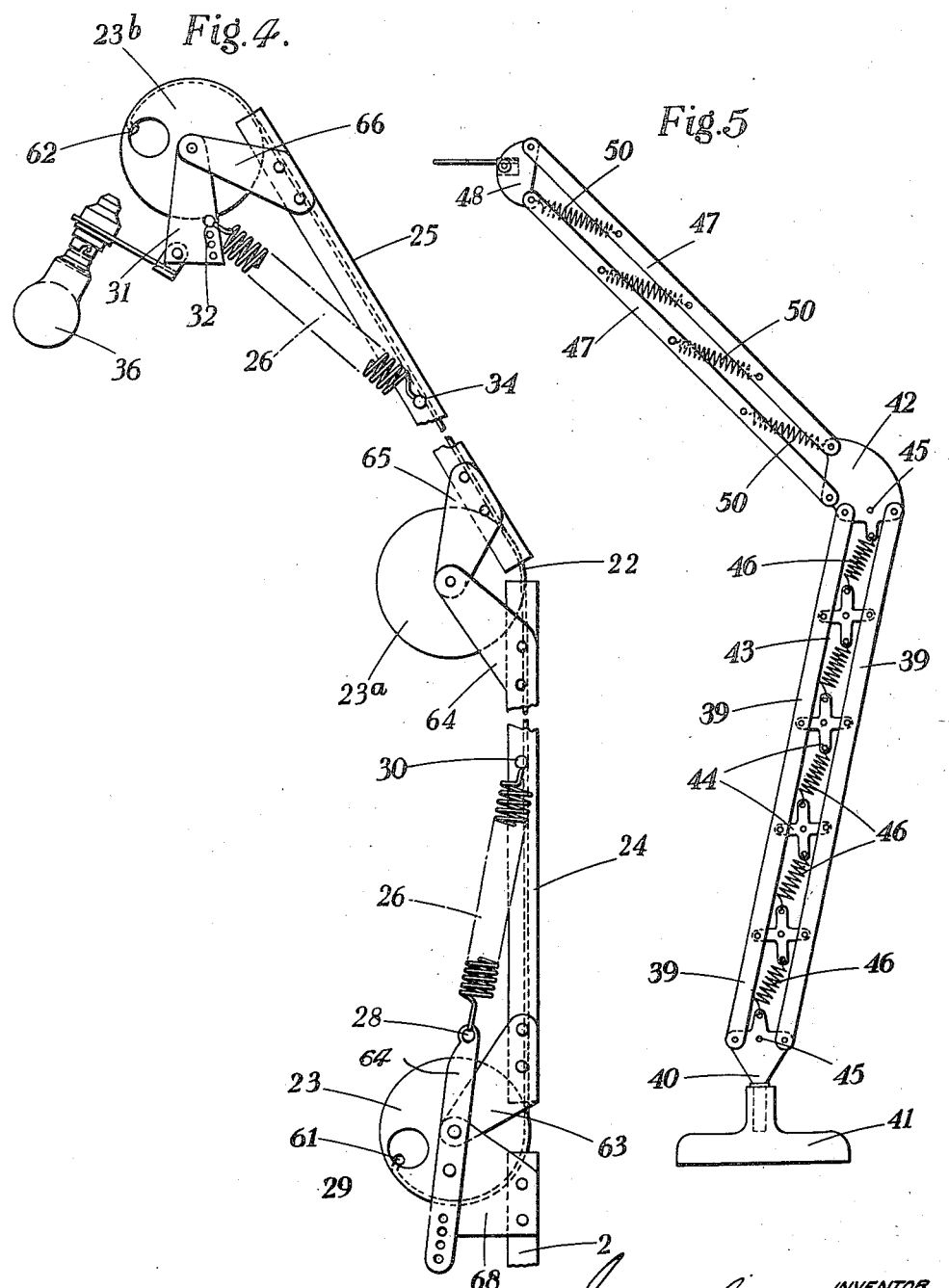
INVENTOR
George Carwardine
BY
Marks Ashleman
ATTORNEY

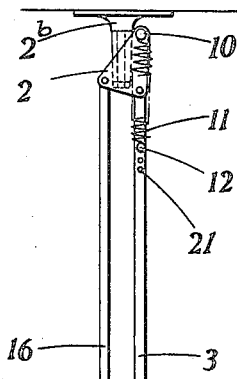
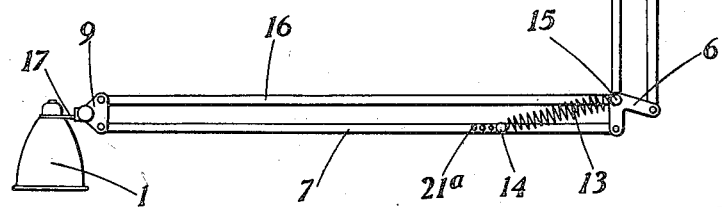
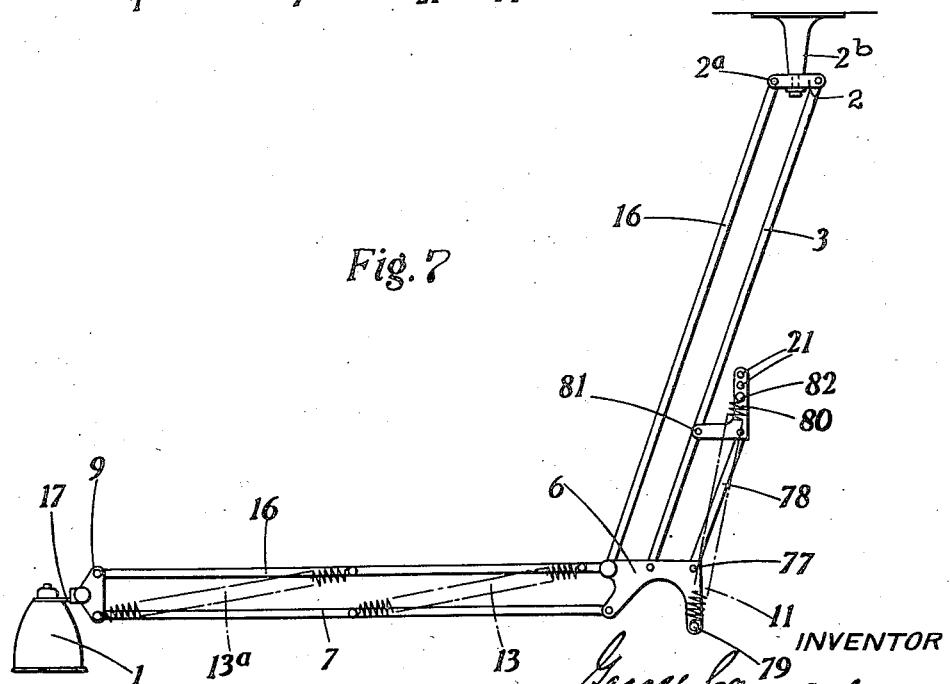

Patented Aug. 17, 1937

2,090,439

UNITED STATES PATENT OFFICE 2,090,439

EQUIPOISING MECHANISM

George Carwardine, Bath, England

Application June 29, 1933, Serial No. 678,317
In Great Britain July 4, 1932

17 Claims. (Cl. 248—160)

This invention relates to equipoising mechanism in which the varying forces exerted by an elastic material, such as a helical spring, are applied so as to set up a force of constant magnitude for counteracting or balancing the force due to gravity acting on a mass pivoted at a distance from its centre of gravity. Although a spring whose elastic properties are such that the pull exerted is proportional to its total length is conveniently used, other elastic counter-balancing means may be employed, such as a spring so connected between two members of a mechanism that the pull it exerts is proportional to the distance at any moment of the points on the two members between which it acts.

It is already known that a mass mounted on the end of a pivoted lever and symmetrically placed can be exactly equipoised by a helical extension spring having a suitable rate and arranged to act between a point on the centre line of the pivoted lever and a point vertically above its pivot, provided that the pull set up by the spring is always proportional to the distance between the two points at which the spring acts.

The object of the present invention is to provide equipoising mechanisms so arranged that the advantages arising from the relation between a spring or springs, and a pivoted mass may be more fully utilized.

If a spring is applied in the above described manner in order to balance an amorphous mass mounted on the end of a pivoted lever, it would be necessary to attach the spring to the lever at a point on the line between the pivot of the lever and the centre of gravity of the mass. This would require a determination of the centre of gravity first which may be rather troublesome in some cases. Moreover, the case may arise in which a second mass is fixed to the end of a second lever which in turn is pivoted to the first mass, in which case the resultant centre of gravity of the two masses changes in position depending upon the angular position of the second lever so that the balance would be disturbed.

Consequently a further object of the present invention is to enable a pivoted mass to be equipoised independently of the actual position of its centre of gravity and in a manner which is unaffected by changes in the position of the centre of gravity, and incidentally to provide means not only for balancing a single mass irrespective of the position of its centre of gravity, but in addition to enable as many masses pivoted one to the other to be balanced as may be desired.

Thus, according to the present invention, an equipoising mechanism which includes an elastic member, such as a spring following the law referred to above, or exerting an equivalent effect, as already mentioned, has at least one pivoted lever interposed between the mass to be balanced and the base or other support for the whole mechanism, but the pivoted lever, or each pivoted lever if more than one is employed, is associated with a parallelogram linkage or an equivalent mechanism so that while the mass to be balanced is able to move in an arc-shaped path about the pivot of the lever on which it is mounted, it is prevented from rotating relatively to the base or other support about an axis parallel to that of the pivot of the lever which carries the mass. There are several possible methods of ensuring that a mass which is pivoted so as to be free to move in an arcuate path shall be prevented from rotating about an axis parallel to the pivot, and one of these consists in associating with the pivoted lever or each pivoted lever, a parallelogram linkage which consists of a link parallel to the lever and two end members. In the case of a lever connected to the base or other support, one end lever is fixed to that support and the other end member is fixed to the mass to be balanced or its carrier, or to an intermediate or conjunctive member of the mechanism. On the other hand, in the case of the lever carrying the mass to be balanced, one end member of the parallelogram is fixed to the mass or its carrier and the other end either to the base or support itself, or to an intermediate member of the mechanism. The invention, however, is not limited to this parallelogram arrangement, as other examples of suitable devices for the same purpose will be referred to below, and in particular a mechanism will be described in which two or more pulleys are mounted in positions so that the two terminal pulleys are embraced by a flexible band or other member which is anchored to them, and if there are any intermediate pulleys the band passes over them with the result that any line on the pulleys in the plane at right angles to the pivots carried by the pulleys maintains the same relative angular positions in all positions of the equipoising mechanism within its range of movement.

It will be realized from the above that there may be a single pivoted lever pivoted to the base or support at one end and to the mass to be balanced or its carrier at the other. Yet again there may be two or more pivoted levers in which case at the conjunction of two of them an intermediate carrier or conjunctive member is provided to which the two levers are pivoted. In such a case, the joints between consecutive pairs of levers may be interconnected to ensure that all joints open simultaneously; otherwise, if one joint was stiffer than another, the looser joint might open completely when the position of the mass to be balanced is changed without the stiffer joint opening appreciably. Furthermore, the intermediate or conjunctive member may be divided into two parts slidably or otherwise connected so that the point at which one of a pair of adjacent levers is pivoted may be moved in relation to the point at which the other lever is pivoted.

When the mechanism for preventing rotation of the mass relatively to the base consists of two or more pulleys and a flexible member, the device has the property that the flexible member does not extend and never becomes slack, so that this mechanism is particularly suitable for supporting an electric lamp which requires considerable adjustment because the pulleys may be formed with grooves which, in addition to the flexible member, can also receive the supply wires for the electric lamp, such as a twin insulated flexible cable which also is not stretched and never becomes slack.

It has already been mentioned that the elastic member employed has the characteristic that the pull exerted by it is proportional to the distance between the two points on the relatively moving members between which the pull is exerted and this distance will usually be the total length of the spring. The spring when not stressed is therefore pre-set so that in the case of a tension spring the convolutions are drawn tightly together. To make this clear, if the spring exerts a pull of 100 lbs. when the points between which it acts are two inches apart it will exert a pull of 200 lbs. when they are four inches apart, and 300 lbs. when they are six inches apart. Therefore, the tension of the spring may be adjusted to suit different masses by arranging to alter the distance between the points between which the spring acts, always provided the relative position of these points is mechanically equivalent to that referred to above, viz., one point of attachment is on the centre line of one of the links and the other vertically above or below the centre at which the said link is pivoted to the support or the mass respectively. The adustment referred to may be made by providing a number of spaced holes in one of the members to which the spring is attached so that the end of the spring can be hooked on to pins passing through one or other of these holes.

The invention may also be applied to balancing of a pivoted mass without regard to the actual position of its pivot. Thus, a pivoted mass such as a heavy lid of a gramophone cabinet can be equipoised by means of an elastic member having the characteristic described above which is connected between a point on the cabinet vertically above the hinge and a point on a line on the lid drawn from the hinge to the centre of gravity of the lid. Such an arrangement is obviously impracticable having regard to modern gramophone construction, but the objection can be overcome by rotating the two points between which the spring acts through equal angles about the centre of the hinge into a more convenient position. In spite of this, however, it would still be necessary to fix the points in some definite relation to the hinge which would require a skill and care which can be rendered unnecessary by employing the present invention. In this way two pairs of equal links arranged parallel to one another are pivoted at one end to a common conjunctive or intermediate member. At the other end one pair is pivoted directly at points on the lid and the other pair are connected at the opposite end to a member pivoted on the body of the cabinet. The rotation of the lid in space is transmitted through the two parallel linkages to the member pivoted on the cabinet which therefore rocks in step with the lid so that its pivot may be considered equivalent to the lid hinged for the purpose of equipoising so that the desired result may be obtained if the elastic member, preferably in the form of a tension spring, is connected between a point on the centre line of the pivoted member on the cabinet and a fixed anchoring point on the cabinet itself which is in line with the centre line when the lid is poised in its highest position.

In order that the invention may be clearly understood and readily carried into effect, some examples of mechanisms in accordance therewith will now be more fully described with reference to the accompanying drawings, in which:—

Figure 1 is an elevation of a desk lamp constructed in accordance with the invention, two positions being shown in full and dotted lines respectively;

Figure 2 is an elevation to an enlarged scale seen from the direction of the arrow $a$ in Figure 1 and showing the part of the mechanism from the top of the base or support to the first joint;

Figure 3 is an elevation of a modified form of lamp suitable for use as a spot light;

Figure 4 is an enlarged elevation corresponding to Figure 3 with certain parts of the levers and the base omitted;

Figure 5 is a side elevation of yet a further modified construction of equipoising mechanism in accordance with the invention;

Figures 6 and 7 are elevations respectively of two forms of pivoted lamps suitable for attachment to a ceiling or similar surface.

Referring first of all to Figures 1 and 2 which illustrate an equipoised electric lamp, the lamp shade is shown at 1 and the support at 2, the latter being mounted on a base 2b on a vertical pivot extending into the base so as to enable the whole of the mechanism and the lamp and the support 2 to be rotated about a vertical axis.

The mechanism consists of a lever 3 which for convenience consists of two arms of equal length spaced apart as seen in Figure 2 and pivoted at their lower ends to the support 2 at the point 4. At its upper end the lever 3 is pivoted at the point 5 to an intermediate or conjunctive member 6 which is in the form of a bell crank lever and which has its lower arm parallel to an arm 2a integral with the support 2. These two arms remain parallel and do not rotate with respect to the support 2 through movements of the lamp shade through its whole range. This is effected by providing a link 16 which with the arms 2a and 6a and the lever 3 constitute a parallelogram linkage. Another pivoted lever 7 is also pivoted to the intermediate member 6 at the point 5 and the lever 7 is pivoted at its other end at the point 8 to a member 9 which constitutes the carrier member for the lamp shade 1. The lever 7 also has a parallel link 16 and the member 9 is in the form of a bell crank lever so that its arms 9a and 9b always remain parallel respectively with the arms 6a and 6b of the member 6. The springs 11 control the lower lever 3 and are attached at their lower ends to a point 10 on the support 2 and vertically above the pivot 4. At their upper ends the springs 11 are anchored to a cross member 12 extending between the arms forming the lever 3 and in fact engaging in a pair of the spaced holes 21 which enable the initial tension of the springs to be adjusted. These springs have the characteristic that much of the strain is pre-set when the coils are closed so that the pull exerted by them is always proportional to their length, that is to say, to the distance between the points 10 and 12.

A similar pair of springs 13 is employed in connection with the other lever 7 and they are connected at one end to a cross pin 14 which is inserted in one of the holes 21a in the pair of arms forming the lever 7 so as to adjust the initial tension of the springs 13. At their lower end the springs 13 are secured to the member 6 at a point 15 vertically above the point 5 which forms the pivot between the levers 3 and 7.

It will be seen that this is an intermediate member which also acts as a carrier member for the lever 3 and its associated springs 11, while the member 9 is a carrier member for the lamp and for the lever 7 and its springs 13. Each lever has associated with it a parallelogram linkage which ensures that as long as the base 2b is stationary the arms 2a, 6a and 9a of the base of the intermediate member and the carrier member remain parallel in all positions of the mechanisms.

For convenience the support 2 has extensions 16a with a gap 16b between them forming a forked upper end so that the links 16 associated with the lever 3 can pass through the gap 16b when the lever 3 swings over sufficiently to make this necessary.

The lamp and its shade 1 are connected to the carrier 9 in such a way that it can rotate about two axes at right angles to one another relatively to the carrier, this being arranged by clamping the lamp and its shade to a stem 17 which can be turned within a clamp 18 until gripped by tightening up an adjusting screw 19. An adjusting screw is also provided at the point 5 so that the joint between the levers 3 and 7 may be tightened or loosened as required.

In order to indicate that this mechanism enables the lamp to be equipoised in any position, two positions are indicated in full and dotted lines respectively in Figure 1.

Referring now to Figures 3 and 4, the chief difference between the construction therein illustrated and that shown in Figures 1 and 2, is the means for preventing rotation of the carriers and intermediate members. Instead of the parallelogram linkages, a pulley 23 is fixed to the support 2. A disk 23a constitutes the intermediate member or conjunctive member and a disk 23b is fixed to the carrier member for a lamp 36. A flexible wire or cable 22 is anchored to the disks 23 and 23b at the points 61 and 62 respectively and it passes over these disks and also over the disk 23a. The levers 24 and 25 in this case are of tubular section and partly embrace the disks and are pivoted by brackets 63, 64, 65 and 66 to the axles of the disks, with the result that when the levers are moved angularly they turn about these axles, but as the cable 22 cannot extend the disks 23, 23a and 23b do not rotate about their own axes as long as the base 2b is kept stationary The equipoising springs 26 employed in Figures 3 and 4 are of the same character as the springs 11 and 13 shown in Figures 1 and 2 and are similarly disposed with regard to the pivots. Thus, the lower springs 26 are connected at a point 28 to a bar 67 which is carried from the support 2 by a bracket 68 which is not immediately vertically above the point 29, but these springs 26 are arranged to be in line with the bar 67 when the lever 24 is vertical or substantially so. This lever will not be exactly vertical when the springs' axes are in alignment with the lever pivot, since the centre of gravity of this lever is not on the centre line between its pivots. Similarly, the springs 26 associated with the lever 25 are at one end connected to the carrier member 31 for the lamp 36, being anchored at the point 32, while at their other ends these springs 26 are connected to the lever 25 at the point 34. In this case also the initial tension of the springs may be adjusted by means of holes in suitable members as described with reference to Figures 1 and 2. The construction is shown applied to a spot light as the lamp 36 can be turned with its stem 35 or about the axis of this stem, while a counterweight 37 is attached to the stem 27 to swivel with the support about a vertical axis and thus balance the base 2b. In Figure 3 also two positions of the mechanism are shown respectively in full and dotted lines.

A further form of construction is shown in Figure 5 in which two parallel links 39 form a lever pivoted to the plate or support 40 which has a stem which can turn in the base 41. The parallelogram is completed at the upper end by the intermediate or conjunctive member 42 and in order to apply the springs to the parallelogram there are a number of cruciform members 44, the opposite lateral arms of each being pivoted to the respective links 39 and the springs 46, which have the characteristics already referred to, are connected in tandem as shown between the plate 40, the cruciform tumblers 44 and the intermediate member 42. Extending between the links 39 on either side is a pair of plates 43 which act merely as cover plates to exclude dust to enclose the springs and tumblers. The arrangement is such that when the links 39 are vertical the axes of the springs 46 and of the tumblers 44 are all in line.

A pair of links 47 also with cover plates 49 is pivoted to the intermediate member 42 and at their upper ends are pivoted to the final carrier member 48 which bears the mass to be balanced. In this case, the springs 50 are arranged obliquely between points on the centre lines of the two links 47. It will be realized that the links 39 and 47 form two pivoted levers equivalent to those in the two constructions already described above.

Figure 6 illustrates a mechanism in accordance with the invention in which the support is overhead and the mechanism is shown applied to an electric lamp supported, for example, from a ceiling. It is clear that if the device shown in Figure 1 were inverted, owing to the arrangement of the pivot points and anchor points the mechanism would collapse. Figure 6, however, represents a corresponding mechanism in which the points of attachment to the springs has been suitably altered to cause the springs to act in the necessary directions, otherwise the apparatus is exactly similar to that shown in Figure 1 and corresponding reference numerals have been employed. The base 2b is secured to a ceiling and the plate 2 corresponds exactly to the support 2 and arm 2a in Figure 1 and is secured to a sleeve enabling it to be rotated relatively to the base 2b. The lever 3 with its link 16 is pivoted to the plate 2 and at the opposite ends to the intermediate or conjunctive member 6. The pair of springs 11 are anchored between a point on the centre line of the lever 3 at 12 and at the other end to the plate 2 at a point 10. The spring can be initially adjusted by means of holes 21 in the lever 3 as in Figure 1. The lever 7 also has its links 16 both pivoted to the intermediate member 6 at one end and to the carrier member 9 for the lamp shade 1 at the other end. The lamp shade 1 is carried on a stem 17 allowing of rotation about the carrier member 9 and associated with the lever 7 is a pair of springs 13 anchored at the point 15 to the intermediate member 6 and at 14 to a point on the centre line of the lever 7. Holes 21a are provided in the lever 7 for the adjustment of the initial tension of the springs 13.

Figure 7 shows a slight variant of the construction shown in Figure 6 and where possible the parts have been similarly numbered. The difference is in the method of mounting and anchoring the springs 11. For this purpose the intermediate member 6 is extended to the right to provide a pivot 77 for a link 78 of an auxiliary parallelogram. The plate 6 is also extended to form an anchor point 79 for the pair of springs 11. The secondary parallelogram is completed by a member 80 shown as a bell crank lever pivoted on the centre line of the lever 3 at the point 81 and having pivoted to it one end of the link 78. The upper end of the springs 11 are pivoted about a pin 82 and the initial tension of the spring 11 is adjusted by selecting one of the holes 21, which in this case are formed in the bell crank member 80. The bell crank member 80 is forked and its upper arms are open so that in an extremely angular position of the mechanism the bell crank can approach the lever 3 and even slightly embrace it. In this construction the horizontal arm of the bell crank member 80 is maintained horizontal and parallel to the upper surface of the member 6 and of the arm 2a so that the spring 11 becomes extended as the lever 3 is swung to one side.

The springs associated with the lever 7 are shown at 13 and 13a. The spring 13 is anchored in exactly the same manner as in Figure 6; the spring 13a is similarly connected between the carrier member 9 and a point on the centre line of the link 16. A spring of suitable rate may be used either in the position 13 or the position 13a or in both positions.

I claim:—

1. An equipoising mechanism comprising a support, a lever pivoted about a horizontal axis to said support, a conjunctive member pivoted about a second horizontal axis to said lever, a second lever pivoted about said second horizontal axis to said conjunctive member and pivotally connected about a third horizontal axis to the mass to be balanced, a spring connected to act between a point on said support disposed in a vertical plane containing said first-named horizontal axis and a point on said first-named lever to exert a turning moment thereon about said first-named horizontal axis, a second spring connected between a point on said conjunctive member disposed in the vertical plane containing said second horizontal axis and above said second horizontal axis and a point on said second lever to exert a turning moment thereon about said second horizontal axis, connecting means between said support and said conjunctive member connected respectively to said support and to said conjunctive member at points remote from said first-named horizontal axis and from said second axis and operative to prevent rotation of said conjunctive member relatively to said support about an axis parallel to said first-named horizontal axis, and connecting means, between said conjunctive member and the mass, connected respectively to said conjunctive member and to the mass at points remote from said second axis and said third axis and operative to prevent rotation of the mass relatively to said support about an axis parallel to said second axis, each of said springs having a characteristic of exerting a force proportional to the distance between the points between which that force is exerted.

2. An equipoising mechanism for supporting a mass in an infinite number of positions relatively to a base comprising a support bearing a pair of pivots and mounted on the base, a lever mounted to turn about one of said pivots, a link equal in length and parallel to said lever, a conjunctive member bearing a pair of pivots respectively connected to said lever and said link and lying in a line parallel to the line containing the pivots on said support, a second lever pivoted to said conjunctive member, a second link equal in length and parallel to said second lever and carried by a further pivot on said conjunctive member, a carrier for the mass to be balanced formed with a pair of pivots connected to said second lever and said second link respectively and lying along a line parallel to the line containing the pivots on said conjunctive member about which said second lever and second link turn, a coiled tension spring anchored between said support and said first-named lever and disposed so as to exert a turning moment upon said lever about the pivotal axis thereof, and a second coiled tension spring anchored between said conjunctive member and said second-named lever so as to exert a turning moment upon said second-named lever about the pivotal axis thereof, each of said springs having the characteristic of exerting a pull substantially proportional to its length.

3. An equipoising mechanism comprising a support, a disk rigidly connected to said support, a lever pivotally connected to said disk at the centre thereof, a second disk pivotally connected at its centre to said lever and rigidly connected to the mass to be balanced, a flexible member extending between and fixed to said disks and a spring connected to exert a balancing force upon said lever about the pivotal axis thereof.

4. An equipoising mechanism comprising a support, a disk rigidly fixed to said support, a lever pivoted to turn about the centre of said disk, a second disk pivotally connected to said lever at its centre, a second lever pivotally connected to the centre of said second disk, a third disk pivotally connected to said second lever at its centre and rigidly connected to the mass to be balanced, a flexible member extending between and fixed to the first and third disks and passing over and engaging said second pulley, a spring connected to said first-named lever and said third disk to exert a balancing force thereon about the pivotal axis thereof and a second power device connected to said second lever to exert a balancing force thereon about the pivotal axis thereof.

5. An equipoising mechanism comprising a support, a lever pivoted to said support, a link equal in length to said lever and pivoted to said support so as to be disposed parallel to said lever, a plurality of cruciform tumblers each having opposite pairs of arms pivoted respectively to said lever and to said link, a tension spring connected between said support and an arm of said tumbler nearest to said support, a carrier bearing two pivots for the remote ends of said lever and said link respectively, a second tension spring connected between said carrier and an arm of said tumbler nearest to said carrier and a plurality of intermediate springs each connected between a pair of adjacent tumblers.

6. An equipoising mechanism comprising a support, a lever pivoted to said support, a link equal in length to said lever and pivoted to said support so as to lie parallel to said lever, a conjunctive member bearing two pivots located in position to be connected to said lever and said link respectively, a plurality of cruciform tumblers each having opposite arms pivoted respectively to said lever and said link, a tension spring connected between said support and an arm of said tumbler nearest to said support, a second spring connected between said conjunctive member and an arm of said tumbler nearest to said conjunctive member, a plurality of additional springs each connected between a pair of adjacent tumblers, a second lever pivoted to said conjunctive member, a second link equal in length to said second lever and pivoted to said conjunctive member so as to lie parallel to said second lever, a carrier for the mass to be balanced bearing pivots located in position to be connected to said second lever and said second link respectively, and a plurality of further springs each connected obliquely between said second lever and said second link.

7. A mechanism for equipoising a movable mass, comprising in combination, a support, a lever pivoted about a horizontal axis to said support, and pivotally connected about a second horizontal axis to the mass to be balanced, connecting means between said support and the mass connected respectively to said support and to the mass at equal distances from the respective pivots of said lever and operative to maintain parallelism between the mass to be balanced and said support, and a spring disposed to act between two points on the assemblage constituted by said support, said lever, said connecting means, and the mass to be balanced, the said two points moving relatively when the mass to be balanced moves and being so disposed in a vertical plane as to be in alinement with the said first horizontal axis when said lever is vertically disposed, said spring having the characteristic of exerting a force between said two points substantially proportional to the distance separating said points.

8. An equipoising mechanism comprising in combination a stationary base, a support journalled about a vertical axis in said base, a lever pivoted about a horizontal axis to said support, a conjunctive member pivoted about a second horizontal axis to said lever, a second lever pivoted about said second horizontal axis to said conjunctive member and pivotally connected about a third horizontal axis to the mass to be balanced, a spring connected to act between a point on said support disposed in a vertical plane containing said first-named horizontal axis and a point on said first-named lever to exert a turning moment thereon about said first-named horizontal axis, a second spring connected between a point on said conjunctive member disposed in the vertical plane containing said second horizontal axis and above said second horizontal axis and a point on said second lever to exert a turning moment thereon about said second horizontal axis, connecting means between said support and said conjunctive member connected respectively to said support and to said conjunctive member at points remote from said first-named horizontal axis and from said second axis and operative to prevent rotation of said conjunctive member relatively to said support about an axis parallel to said first-named horizontal axis, and connecting means, between said conjunctive member and the mass, connected respectively to said conjunctive member and to the mass at points remote from said second axis and said third axis and operative to prevent rotation of the mass relatively to said support about an axis parallel to said second axis, each of said springs having a characteristic of exerting a force proportional to the distance between the points between which that force is exerted.

9. In a load balancing device, an assemblage including a support, a load mass, and a parallel motion device connecting the support and load mass, said assemblage having a spring so connected between two spaced points which move from or toward each other as the parallel motion device swings on its pivots, as to vary the force exerted by said spring in proportion to the varying distance between said points at any instant upon movement of said mass relative to said support, said points being positioned to have a minimum spacing when the moment arm of the mass is zero, the construction and arrangement being such that the tension of the spring changes in direct proportion to its length at any instant whereby the load is balanced for all positions of the parallel motion device.

10. An equipoising mechanism for a load mass comprising a support, a lever pivoted to said support, a link equal in length to said lever and pivoted to said support so as to be disposed parallel to said lever, a plurality of cruciform tumblers each having opposite pairs of arms pivoted respectively to said lever and to said link, a tension spring connected between said support and an arm of said tumbler nearest to said support, a carrier bearing two pivots for the remote ends of said lever and said link respectively, a second tension spring connected between said carrier and an arm of said tumbler nearest to said carrier and a plurality of intermediate springs each connected between a pair of adjacent tumblers, the construction and arrangement being such that each of said springs exerts a force at any moment directly proportional to the distance between the points between which that force is exerted.

11. A mechanism for equipoising a movable mass, comprising in combination, a support, a member carried by said support, a plurality of interconnected hinged parallelogram linkages interposed between the movable mass and said member carried by said support, a spring anchored to said member and opertaively connected to one of said parallelogram linkages adjacent said support, and a second spring anchored to the linkage connecting means and operatively connected to another of said parallelogram linkages, the construction and arrangement being such that each spring exerts a force directly proportional to its total length at any instant.

12. An equipoising mechanism for supporting a movable mass comprising in combination a support, a lever pivoted about a horizontal axis to said support, a conjunctive member pivoted about a second horizontal axis to said lever, a second lever pivoted about a horizontal axis to said conjunctive member pivotally connected about a horizontal axis, remote from said axis between said second lever and said conjunctive member, to the mass to be balanced, said conjunctive member and said mass being connected at points spaced from said lever connections, a spring connected between said support and said first mentioned lever operative to exert a balancing force on said first-mentioned lever, and a second spring connected between said conjunctive means and said second lever and operative to exert a balancing force on said second lever, the construction and arrangement being such that the force exerted by the springs varies substantially in direct proportion to the changes in their lengths.

13. A mechanism for equipoising a movable mass, comprising in combination, a support, a lever pivoted about a horizontal axis to said support, and pivotally connected about a second horizontal axis to the mass to be balanced, connecting means between said support and the mass connected respectively to said support and to the mass at equal distances from the respective pivots of said lever and operative to maintain parallelism between the axes of the mass to be balanced and said support, and a spring disposed to act between two points on the assemblage constituted by said support, said lever, said connecting means, and the mass to be balanced, the said two points moving relatively when the mass to be balanced moves and being so disposed in a vertical plane as to be in alinement with the pivots of the lever when the two pivots of the said lever are vertically disposed, the construction and arrangement being such that the tension of the spring varies in direct proportion to the distance between said two points thereby balancing the load for all positions of the mass.

14. In mechanism for equipoising a movable mass, a support, a pair of levers each pivoted at one of its ends to said support, a conjunctive member having three triangularly arranged pivots, said levers being connected to two of said pivots, spring-means normally holding said levers in definite angular relation to the axis of said support and arranged to permit swinging of said levers out of normal position, a second pair of levers, one end of one of said levers being pivoted to said conjunctive member at the point of pivoting of one of the first levers and the corresponding end of the other lever of the second pair being pivoted to the third pivot of said conjunctive member, a carrier for the movable mass having two pivot points, said second pair of levers having their remaining ends pivoted to the pivot points of the said carrier and spring means anchored to the conjunctive member and one of the levers of the second pair, the construction and arrangement being such that each of the springs exerts a force substantially directly proportional to its length at any moment.

15. A mechanism for equipoising an electric lamp comprising in combination a support, a disk fixedly connected to said support, a lever pivotally connected to said disk at the centre thereof, a second disk pivotally connected at its centre to said lever, means for connecting an electric lamp to said disk, a flexible member extending between said disks and fixed to said first disk and having supply conductors for the electric lamp incorporated therein, and a spring connected between said support and said lever for exerting a turning moment upon said lever about the pivotal axis thereof, said mechanism being so constructed and arranged that the force exerted by the spring varies substantially in proportion to its length.

16. A mechanism for equipoising a movable mass having a longitudinal axis and comprising in combination, a support having a longitudinal axis, a lever pivoted thereto to swing about a horizontal axis passing through said support, said mass being pivoted to the lever to swing about a horizontal axis spaced from the first pivotal axis, means connecting the mass and support and maintaining the longitudinal axis of the mass in constant angular relation to the longitudinal axis of the support in all positions of the mass, and a spring connected between said support and lever, the points of connection moving toward and from each other as the mass is moved about the first pivotal axis, the construction and arrangement being such that the spring exerts a force substantially directly proportional to the distance between said points of connection.

17. In means for equipoising a vertically movable mass, a pair of four sided parallel motion frames having their sides in a vertical plane and having one side in common whereby said frames are connected end to end, the side of one frame opposite the side in common constituting a support, the side of the other frame opposite the side in common carrying the mass to be equipoised, the frames being so interconnected as to be movable in unison while maintaining the same angular relation and further movable to vary the angular relation between said frames, and a spring for each frame and having connection at its ends to two points on respective members of the respective frame, said points varying in distance as the frames swing, the construction and arrangement being such that each of said springs exerts a force between said two points substantially proportional to the distance separating said points.

GEORGE CARWARDINE.